July 21, 1936. B. T. CARLSSON ET AL 2,048,372
FRICTION CLUTCH
Filed Oct. 5, 1933  2 Sheets-Sheet 2

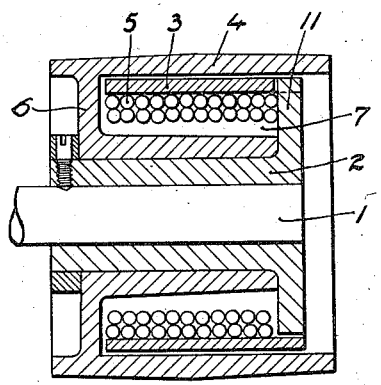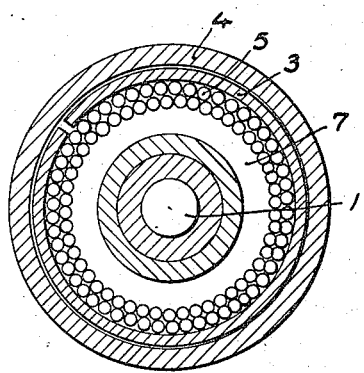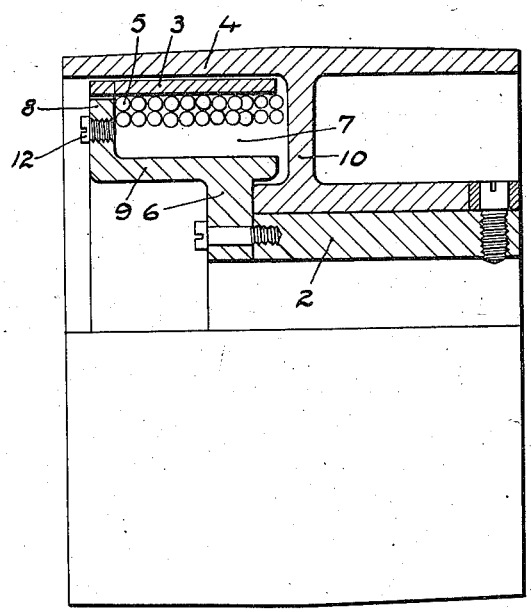

Bernhard Torbjörn Carlsson
Gösta Olof Winhammar
INVENTORS their ATTORNEY.

Patented July 21, 1936

2,048,372

UNITED STATES PATENT OFFICE 2,048,372

FRICTION CLUTCH

Bernhard Torbjörn Carlsson, Malarhojden, and Gösta Olof Winhammar, Stockholm, Sweden Application October 5, 1933, Serial No. 692,240
In Sweden September 30, 1932

2 Claims. (Cl. 192—105)

In automatic friction clutches it has been the practice to guide the centrifugal parts of the carrying device by more or less complicated arrangements of levers, carrying pins, spiders, spiral or flat springs, vanes, scoops or other similar devices. Such carrying- and guiding members often unbalance the clutch and are subject to wear and tear and are consequently variable and unreliable in operation.

The present invention is applicable to clutches of the known type that comprises two cylinders, one located within the other and cut open in axial direction and in which the inner cylinder is elastic in a radial direction. The invention is characterized in that the centrifugal parts lie completely free in the hollow space of the clutch, so that when the clutch is rotated without the assistance of any carrying member or guiding device and exclusively in response to the rotation and the centrifugal force, said parts will be automatically pressed outwards against the inner cylinder, uniformly distributed over the whole circumference thereof, where they exert a pressure uniformly distributed over the whole surface.

The accompanying drawings illustrates the invention.

Figure 1 shows a longitudinal section of the clutch.

Figure 2 is a cross section of the same clutch.

Figures 3 and 4 are longitudinal sections of two modified embodiments.

Figure 4:
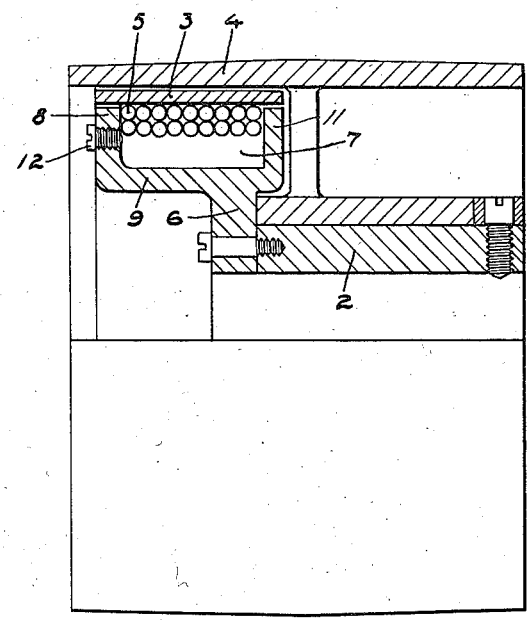

Numeral 1 indicates a driving shaft, for instance a motor shaft, a gear shaft or the like. A hub 2, provided with one or more flanges, is keyed to the shaft 1, a radially movable cylinder 3, which is cut open in axial direction being disposed on the said hub, the said cylinder being by means of alternate shoulders and recesses 13, 14, 15, 16, so connected with the hub flange, or flanges, or any other portion of the hub 2 that it participates in the rotation of the hub. An outer cylinder or casing 4 is rotatably journalled on the hub 2, the said cylinder or casing being indicated in the drawing shaped as a belt band. The hollow space 7 formed between the hub 2, the cylinder 3 and the casing 4 and a radial flange 6 on the same, is completely or partly filled with centrifugal material, shot, balls or bodies of other suitable form and material 5.

When the driving device, for instance the motor is being started the hub 2 with the cylinder 3 is caused to rotate, whereupon the centrifugal material 5, due to the centrifugal force, is thrown outwards towards the inner circumference of the cylinder 3. On account of the pressure of the centrifugal material 5 on the cylinder 3 the latter is spread open and presses against the surrounding casing 4 and carries it along. The power transmission of the clutch may be varied by increasing or reducing the quantity of centrifugal material in the clutch.

In the embodiment shown in Figure 3 the radial flange 6 of the hub 2 is not made integrally with the hub 2 but is only secured to the same. The hollow space 7 for the bodies 5 is here formed by an outer radial part 8 of the flange 6, a middle axial part 9 of the said flange, a waist 10 on the casing 4, and by the elastic ring 3. If the waist 10 is perforated or replaced by spokes the member 6 is provided with an inner radial member 11 (see Fig. 4) for limiting the hollow space 7. The flange 8 is provided with a filling opening for the bodies 5, which opening is closed by means of a screw 12.

Many embodiments of the invention may be possible. So for instance, one or both of the radial members enclosing the hollow space 7 may consist of a disc secured to the hub 2 and the member 9, respectively, by means of a screw, or secured in some other way. The inside of the elastic member may be rifled or provided with grooves 17.

The drawings show the embodiment as a belt pulley, but the clutch may also be made as a shaft clutch or for toothed gear, chain wheel, cone belt etcetera. The clutch may also be used both for horizontal and vertical operation.

Having now described our invention, what we claim as new and desire to secure by Letters Patent is:

1. A friction clutch comprising two cylinders constituting the friction elements of the clutch provided inside one another, the inner cylinder being split in an axial direction so as to permit its spreading in a radial direction, freely moving bodies within said inner split cylinder, two radial walls enclosing said split cylinder housing said bodies, one of said walls being perforated to permit filling of the space within the split cylinder with said bodies, and a rotary element passing through the space occupied by said freely moving bodies, whereby upon the rotation of said element the bodies are substantially uniformly distributed over the inner surface of said inner split cylinder.

2. A friction clutch according to claim 1 and in which the inside surface of said inner split cylinder is rifled.

BERNHARD TORBJÖRN CARLSSON.
GÖSTA OLOF WINHAMMAR.